UNITED STATES PATENT OFFICE.

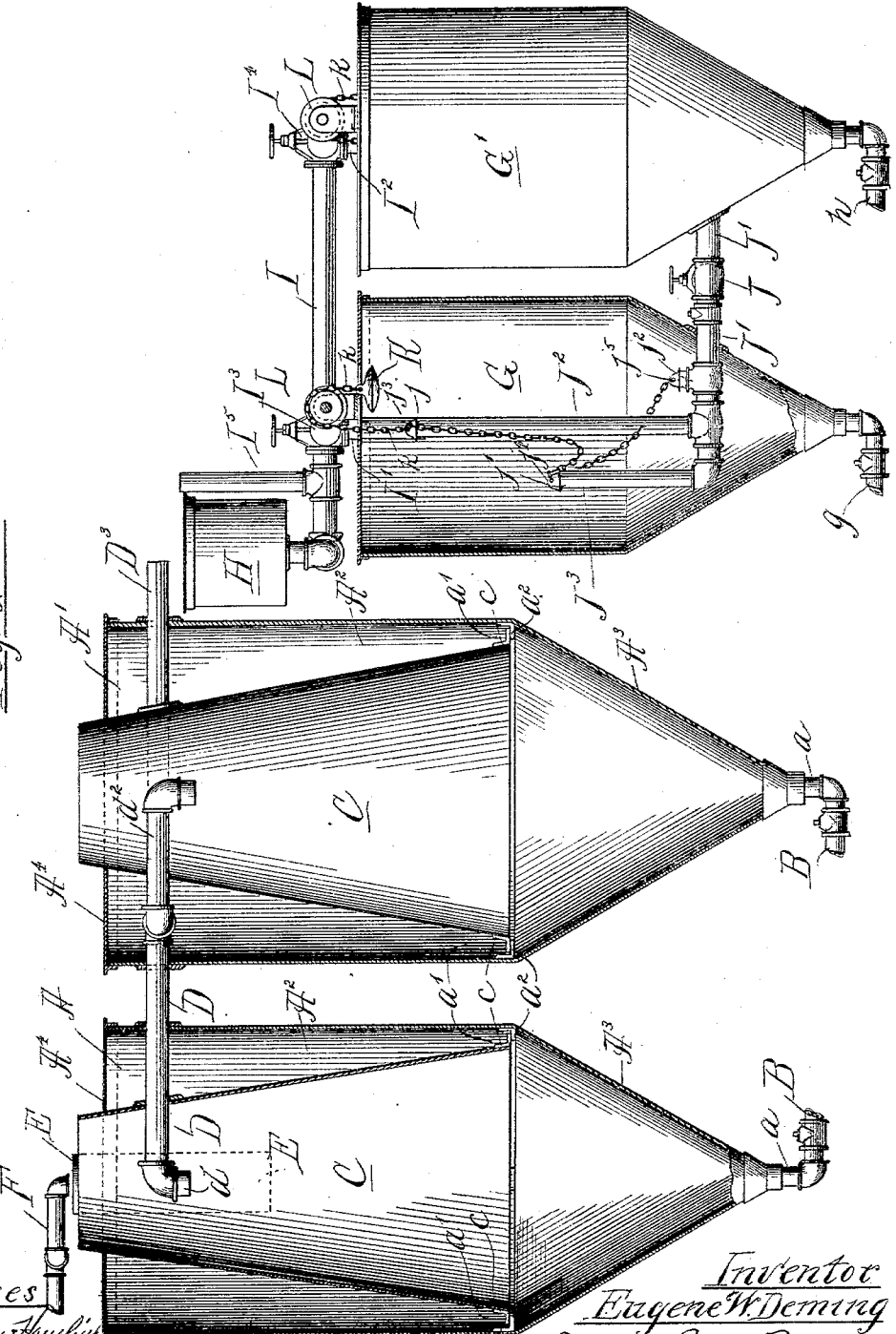

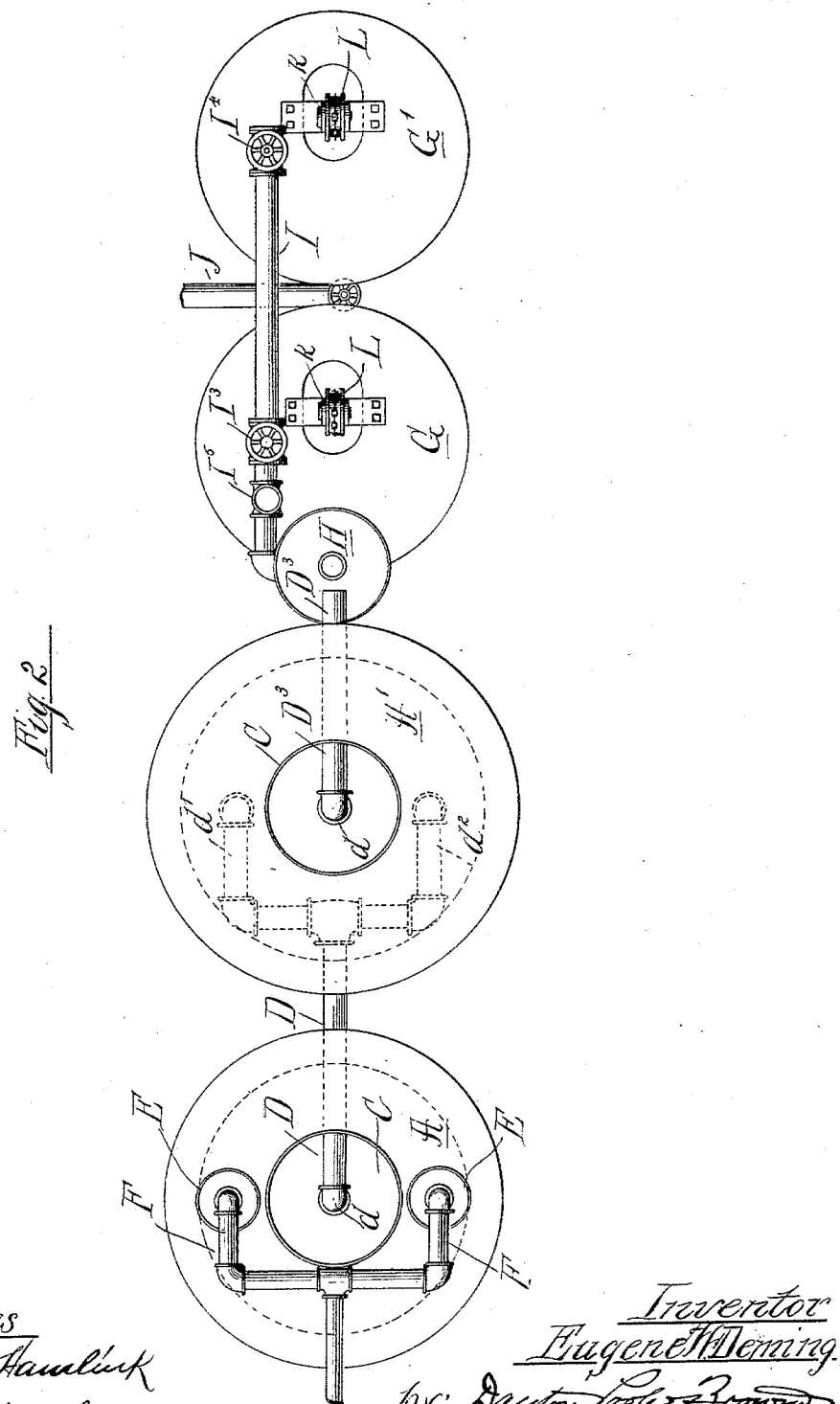

EUGENE W. DEMING, OF NEW ORLEANS, LOUISIANA.

APPARATUS FOR CLARIFYING SOLUTIONS.

SPECIFICATION forming part of Letters Patent No. 566,726, dated August 25, 1896.

Application filed January 20, 1896. Serial No. 576,114. (No model.)

*To all whom it may concern:*

Be it known that I, EUGENE W. DEMING, a resident of New Orleans, in the parish of Orleans and State of Louisiana, have invented certain new and useful Improvements in Apparatus for Clarifying Solutions; and I do hereby declare that the following is a full, clear, and exact description thereof, reference being had to the accompanying drawings, and to the letters of reference marked thereon, which form a part of this specification.

This invention relates to improvements in apparatus for separating from solutions impurities held in suspension therein, the apparatus herein described being specially designed for use in clarifying saccharin solutions which have been previously subjected to a suitable treatment, (usually the application of heat and reagents,) whereby the impurities have been coagulated and may be precipitated by proper manipulation of the liquid.

The apparatus herein described may be used very advantageously in conjunction with a digester for superheating and coagulating the solution preparatory to separating the impurities therefrom, like that set forth in a prior patent, No. 531,460, granted to me December 25, 1894, but it is to be understood that the preliminary treatment of the solution may be accomplished in any other preferred manner.

The object of the invention is to provide an apparatus by means of which the impurities may be rapidly and effectively precipitated and separated from the solution with the least possible manipulation of the latter, and at the same time so constructed and arranged as to enable the process of separation to be continued uninterruptedly and with great economy.

As the liquid comes from the digester or other apparatus wherein it has been treated it is in a heated state, and the impurities may be said to exist in three general forms, one portion consisting of a relatively heavy granular precipitate which readily settles to the bottom of the tank; a second portion, which has a tendency to rise to the surface, but which may be precipitated if thoroughly beaten into the liquid and directed to the bottom of the tank, and a third portion in the form of a fine feculent substance which can only be thoroughly precipitated by the most careful manipulation.

An apparatus embodying my invention comprises as its main features a series of tanks, preferably of upright cylindric form, having conical downwardly-tapering bottom ends provided with suitable taps for removing the sediment therefrom, each tank having an internal uptake arranged with its intaking end located near the bottom of the tank and provided with an overflow-outlet located at its upper end and from which the liquid is conducted to the upper end of the next tank of the series. Such a construction compels the liquid to take a tortuous course in its passage through each tank. Entering the tank at its upper end, exterior to the uptake, the juice will first be directed to the bottom of the tank where the heavier precipitate will be deposited, then caused to ascend quietly within the uptake, undisturbed by the inpouring liquid, and finally be educted from the upper end of the uptake and conveyed to the upper part of the next tank of the series.

As a distinct and further improvement I provide additional apparatus which will be employed when it is desired to produce the choicest grades of sugar, consisting of one or more supplemental tanks of improved construction, wherein the liquid may be given a period of absolute rest and from which it may be subsequently removed with the least possible agitation and therefore in its purest state.

The invention may be more readily understood by reference to the accompanying drawings, in which—

Figure 1 illustrates an apparatus for carrying out my invention comprising two main settling-tanks and two supplemental settling-tanks connected in series, the first three of the series being shown in central vertical section. Fig. 2 is a plan view of the same.

First describing the series of main settling-tanks A A', each of said tanks comprises a cylindric upper portion $A^2$, provided with a conical-shaped lower end $A^3$, converging downwardly to a central outlet $a$, provided with a valved outlet-pipe B. The upper end of the tank is provided with a suitable cover $A^4$.

C designates, as a whole, a large conical-shaped pipe, for convenience hereinafter designated an "uptake," arranged centrally within the tank, with its larger lower end located adjacent to the lower end of the tank, as herein shown, approximately on the level with the cylindric part thereof. The lower end of the uptake C is of relatively large diameter, so as to occupy the larger part of the area of the tank at which it is located and to leave a relatively narrow annular passage $a'$ between the upper part of the tank and the conical lower end thereof exterior to said uptake. The sides of the uptake converge upwardly from the lower end thereof, and preferably, and as herein shown, at an angle of about thirteen degrees from a vertical, the upper end of the uptake being arranged in this instance to extend upward through the cover $A^4$. The uptake C is conveniently, and as herein shown, supported in position within the tank by means of a plurality of radially-projecting arms $c\ c$, secured to the lower margin of the uptake and adapted to rest upon correspondingly-arranged inwardly-projecting arms $a^2\ a^2$, secured to the interior of the tank, these arms conveniently having the form of angular bars riveted or otherwise rigidly secured to their respective parts.

D designates an overflow-pipe arranged to extend horizontally inward through the cylindric side wall of the tank near the upper end thereof, through the side wall of the uptake, and communicating with the interior of the latter. In order that the outlet-pipe D may educt the liquid from a point somewhat below the surface thereof, it is shown as provided with a downturned intaking end $d$, which extends a short distance below the lowest level of the horizontal part of the pipe.

From the first tank A the outlet-pipe D leads through the side wall of the next of the series and communicates with the latter at the upper part thereof and exterior to the uptake therein. In order that the disturbance created by the inflowing liquid may be distributed evenly over the area of the tank, the pipe D is shown as provided with branches $d'\ d^2$, which are arranged to extend at either side of the upper end of the uptake and to discharge at diametrically opposite points within the tank. The tank A' is also provided with an overflow-outlet pipe $D^3$, communicating with the interior of the upper end of the uptake, and constructed and arranged substantially similar to the pipe D of the tank A.

The liquid, as it enters the first settling-tank from the digester or other apparatus wherein it has been previously treated, contains a certain proportion of lighter coagulated matter, which has a tendency to rise to the surface of the liquid, but which will be precipitated if thoroughly beaten into the liquid and carried below the surface thereof. To this end, therefore, the first settling-tank A will preferably be provided with one or more open-ended vertically-arranged downtakes, as E E, of relatively small diameter, and arranged to receive the liquid from the inlet pipe or pipes F F. Said downtakes are conveniently, and as herein shown, supported by the cover $A^4$ at opposite sides of the uptake C and with their lower ends extending some distance below the normal level of the liquid within the tank. The result of thus confining the supply of liquid as it enters the tank is to give a downward current of considerable force, which effectually carries the lighter substances downwardly to the lower part of the tank.

The foregoing apparatus, consisting of a series of two or more tanks arranged and connected as described, constitutes a sufficient and complete clarifying apparatus for the purpose of producing certain grades of sugar; but the liquid drawn from the second or last tank of the series will still contain a certain percentage of fine feculent impurities, which must be removed in order to produce the choicest grades of sugar. As an additional means, therefore, for precipitating these latter impurities I provide one or more supplemental settling-tanks G G', into which the liquid is conveyed from the last settling-tank A' of the series. The general form of these supplemental tanks is similar to that of the tanks A A', and they are also each provided with an outlet-pipe $g\ h$, respectively, connected with their conical lower ends, similar to those of the previously-described tanks. The size of the supplemental tanks may, however, be smaller than the main settling-tanks.

In order to convey the liquid from the tank A' to the supplemental settling-tanks, the pipe $D^3$ is arranged to discharge into a small flush-bowl or receiving-tank H, from the lower part of which a line-pipe I leads to the several settling-tanks, said line-pipes being provided with vertical depending branch portions $I'\ I^2$, which pass down through the covers of the several tanks and discharge into the lower parts of the latter. The line-pipe I is conveniently provided at the juncture with each down-pipe therewith with a two-way or cross valve, as $I^3\ I^4$, by means of which the liquid may be permitted to enter either tank or directed along the line-pipe, as desired.

In order that any air or gas which may pass from the receiving-tank H into the line-pipe may be permitted to escape, a vent-pipe $I^5$ is provided in the upper side of the said line-pipe at a point between the receiving-tank H and the first settling-tank, said vent-pipe being of sufficient height to prevent overflow therefrom.

In order that the solution may be drawn from the supplemental tanks from near the surface of the latter, so as to create as little disturbance or movement of the body of the liquid as possible, means are provided constructed and arranged as follows: J designates an outlet-pipe line arranged adjacent to the lower parts of the tanks and provided with suitable branches J' J', which discharge the respective tanks G G' through the conical side walls of the lower parts of the latter. Each of the branches J' is provided at points within the tank with a plurality of inlets, as $j j' j^2$, arranged at different heights. A convenient construction, and that herein shown, consists of a plurality of vertically-arranged pipes $J^2 J^3$, communicating with the main pipe J' and each provided at its upper end with a valve or stopper $j^3 j^4 j^5$, the third inlet $j^2$ being arranged to open directly into the main branch J' and being provided with a similar stopper $j^5$. In order that these several valves or stoppers may be successively opened automatically as the level of the liquid in the tank descends, they are arranged to be opened by means of a float K, with which is connected a chain $k$, which is trained over a suitable pulley L, mounted upon the upper part of the tank, and is connected with the several stoppers. The length of the chain and the points at which the several stoppers are connected therewith are so adjusted that as the float descends with the level of the liquid the stoppers will be successively raised from their seats. The lower stopper $j^5$ will preferably be so constructed as to prevent its complete withdrawal from its seat and to open when lifted a short distance.

The operation of the apparatus as thus described is as follows: The liquid enters the tank A through the pipe F and entering the downtakes E E is directed to the bottom of the tank exteriorly to the uptake C. The downwardly-converging space terminating in the relatively narrow annular passage $a$ at the lower margin of the uptake C insures that the liquid will be carried into the conical bottom of the tank with a considerable current, thus facilitating the precipitation of the coagulated impurities. After reaching the bottom part of the tank the liquid ascends quietly within the uptake C, the latter preventing the disturbing influence of the entering liquid from affecting the rising portion thereof, which latter is educted from the upper part of the uptake containing the purest solution. Entering the second tank of the series the liquid is again caused to follow the same tortuous course in its passage through the tank, and an additional amount of precipitate thus deposited. The precipitate collected at the lower ends of the conical bottoms of the tanks is removed from time to time by means of the valved outlet-pipes connected therewith in an obvious manner.

When it is desired to bring into use the supplemental settling-tanks, the liquid is conveyed from the last one of the series of tanks A A' to said supplemental settling-tanks in the manner hereinbefore described, which supplemental tanks, after being filled, are allowed to stand for a certain period of time before the liquid is withdrawn therefrom, so that the liquid therein may come to a perfect rest and the light feculent matter be thus precipitated. Obviously while the liquid is thus standing within the tanks the float must be supported in such manner as not to withdraw the stoppers, and this may conveniently be done by allowing the float to rest upon the upper part of the tank. After the liquid has stood in the supplemental tanks a sufficient length of time the float is removed from its support and allowed to rest upon the surface of the liquid, thereby withdrawing the first stopper and the remaining stoppers successively as the level of the liquid falls. The stoppers, which are entirely withdrawn from the ends of their respective pipes, must obviously be replaced by hand before the tank can again be refilled.

I claim—

1. An apparatus for clarifying solutions comprising an upright tank, a vertical uptake arranged within said tank having an enlarged lower end, the latter being arranged near the bottom of the tank, an inlet-pipe communicating with the upper end of the tank exteriorly to the uptake, and an outlet-pipe leading from the interior of the upper end of the uptake, substantially as described.

2. An apparatus for clarifying solutions comprising a tank having a conical bottom converging downwardly, a conical uptake-pipe arranged within the tank, the lower end of the uptake being arranged near the bottom of the tank and its upper end extending above the overflow-level of the tank, means for removing precipitate from the lower end of the conical bottom of the tank, and an overflow-pipe communicating with the upper end of the uptake, substantially as described.

3. An apparatus for clarifying solutions comprising a series of tanks each having a conical bottom converging downwardly, a conical uptake within each tank, the lower end of each conical uptake being arranged near the bottom of the tank, and its upper end being arranged to extend above the overflow-level, means for removing precipitate from the lower end of the conical bottom of each tank, and an overflow-pipe communicating with the upper part of the uptake of each tank of the series exterior to the uptake thereof, substantially as described.

4. An apparatus for clarifying solutions comprising a tank having a conical bottom converging downwardly and provided with an open-ended downtake-pipe of relatively small diameter into which the liquid is received, a conical uptake having its funnel-shaped lower end arranged near the bottom of the tank, a valved outlet at the lower end of the tank for removing precipitate from the latter, and an overflow-pipe communicating with the upper part of the uptake, substantially as described.

5. An apparatus for clarifying solutions comprising a tank having a conical bottom converging downwardly, and provided with an open-ended downtake-pipe of relatively small diameter into which the liquid is received, an uptake having a funnel-shaped lower end located near the bottom of the tank, a valved outlet at the lower end of the tank for removing precipitate from the latter, and an overflow-pipe communicating with the upper part of the uptake, and provided with a downturned end arranged to educt the liquid from a point below the surface thereof, substantially as described.

6. An apparatus for clarifying solutions comprising a cylindric tank having a conical bottom converging downwardly and provided with a centrally-arranged conical uptake, the larger lower end of which is arranged near the bottom of the tank, and is of a diameter somewhat less than the internal diameter of the tank so as to provide a relatively narrow annular passage between the lower end of the uptake and the sides of the tank, said uptake extending at its upper end above the overflow-level of the tank, a valved outlet at the lower end of the tank for removing precipitate from the latter, and an overflow-pipe communicating with the upper part of the uptake, substantially as described.

7. An apparatus for clarifying solutions comprising a cylindric tank having a conical bottom converging downwardly and provided with a centrally-arranged conical uptake, the larger lower end of which is arranged near the bottom of the tank, and is of a diameter somewhat less than the internal diameter of the tank so as to provide a relatively narrow annular passage between the lower end of the uptake and the sides of the tank, said uptake being arranged to extend at its upper end above the overflow-level of the tank, a valved outlet at the lower conical end of the tank for removing precipitate from the latter, open-ended vertically-arranged downtakes arranged in the upper end of the tank at opposite sides of the uptake, and an overflow-pipe communicating with the upper parts of the uptake, substantially as described.

8. A supplementary settling-tank having cylindric sides and a conical downwardly-converging bottom, an inlet communicating with the upper end thereof, means for discharging the tank comprising a discharge-pipe extending within the tank through the lower part of the side wall, and provided with a plurality of valved discharge-pipes located within the tank having outlets therein at different heights, substantially as described.

9. A supplemental settling-tank having cylindric sides and a conical downwardly-converging bottom provided with a valved outlet, an inlet communicating with the upper end of the tank, and means for discharging the tank comprising a discharge-pipe extending within the tank through the lower part of the side wall thereof, and provided within the tank with a plurality of upwardly-extending branch discharge-pipes an independent valve or closure for each of said interiorly-located branch pipes, and means for opening said valves successively, substantially as described.

10. A supplemental settling-tank having cylindric sides and a conical downwardly-converging bottom provided with a valved outlet, an inlet communicating with the upper end of the tank, and means for discharging the tank comprising a discharge-pipe extending within the tank through the lower part of the side wall thereof, and provided within the tank with a plurality of upwardly-extending branch discharge-pipes each provided with an independent valve or closure, and means for opening said valves successively comprising a float arranged within the tank, and a flexible cable connected with said float and with the several closures and trained over a pulley between the float and the latter, substantially as described.

In testimony that I claim the foregoing as my invention I affix my signature, in presence of two witnesses, this 16th day of January, A. D. 1896.

EUGENE W. DEMING.

Witnesses:
C. S. KELLOGG,
ALF. S. DU FOSSAL.